United States Patent [19]

Holmstrom

[11] 4,178,834

[45] Dec. 18, 1979

[54] MACHINE TOOL HAVING DEFLECTION COMPENSATION FOR TOOL SUPPORT ARM

[75] Inventor: Paul E. Holmstrom, Cincinnati, Ohio

[73] Assignee: The Warner & Swasey Company, Cleveland, Ohio

[21] Appl. No.: 809,170

[22] Filed: Jun. 23, 1977

[51] Int. Cl.² ............................................. B23Q 11/00
[52] U.S. Cl. ................................... 409/80 C; 409/84; 409/207; 408/1 R; 408/8; 408/234; 409/239
[58] Field of Search ................. 90/DIG. 28, 14, 11 R, 90/11 C, 11 F; 408/234, 235, 8, 1

[56] References Cited

U.S. PATENT DOCUMENTS

| 3,227,047 | 1/1966 | Jones et al. | 90/DIG. 28 |
| 3,339,253 | 9/1967 | Seidel | 90/DIG. 28 |
| 3,827,333 | 8/1974 | Hurd | 90/14 |

FOREIGN PATENT DOCUMENTS

| 2603900 | 8/1976 | Fed. Rep. of Germany | 408/235 |
| 899497 | 6/1962 | United Kingdom | 408/234 |

*Primary Examiner*—Gil Weidenfeld

[57] ABSTRACT

An improved machine tool includes an extendible ram or tool support arm. As the ram is extended, the outer end portion of the ram deflects downwardly under the influence of gravity. To compensate for the deflection of the ram, the angular orientation of the ram relative to upwardly extending tracks is changed to raise the outer end portion of the ram. This is accomplished by means of gibs or deflection compensation cams which are moved to rotate a carriage or saddle on which the ram is mounted. The extent of deflection of the ram varies as a function of the distance which it extends outwardly from the carriage. Therefore it is necessary to store data indicative of the deflection of the ram at various degrees of extension and to adjust the orientation of the ram in accordance with this data as the ram is extended. The data indicating the extent to which the ram deflects is stored by means of a cam mounted on the carriage. The cam is read by a transducer which moves with the ram. The extent of deflection of a second tool support arm or boring bar carried by the ram varies as a function of the extent to which the boring bar extends outwardly from the ram. Accordingly, a cam connected with the ram is read by a transducer connected with the boring bar to determine the compensation for deflection of the boring bar relative to the ram. Relatively heavy right angle drive attachments may be utilized in association with the ram. Therefore a third cam is provided to store data indicative of the deflection which results from mounting of the attachment on the outer end of the ram.

50 Claims, 15 Drawing Figures

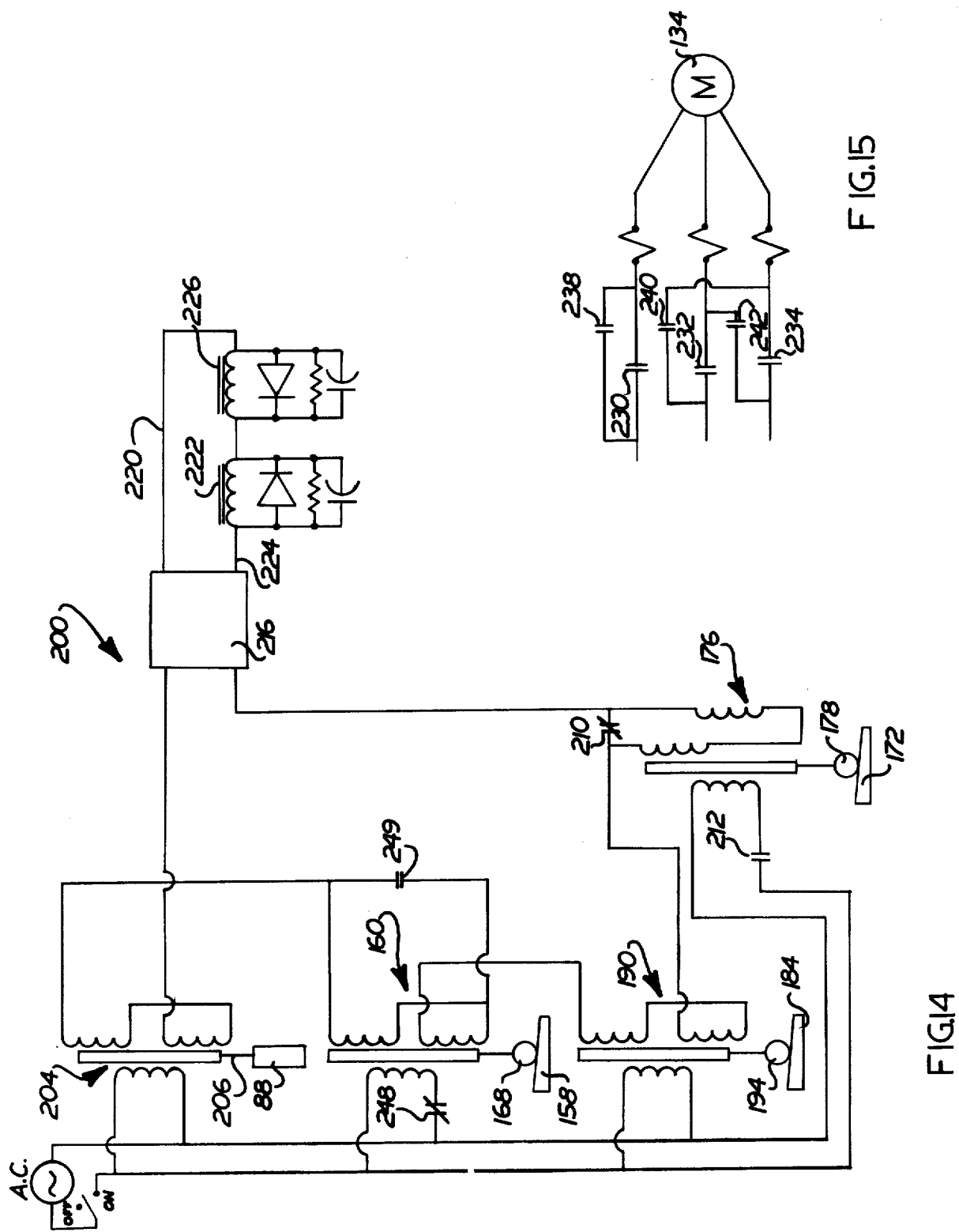

MACHINE TOOL HAVING DEFLECTION COMPENSATION FOR TOOL SUPPORT ARM

BACKGROUND OF THE INVENTION

The present invention relates to a new and improved machine tool and more particularly to an apparatus and method to compensate for deflection of one or more extendible tool support arms.

During the operation of horizontal boring, milling and drilling machines, a ram or tool support arm is commonly extended to move a rotating tool relative to a workpiece. As the ram is extended, the outer end portion of the ram droops downwardly under the influence of gravity. Although the total downward deflection may be relatively small, for example 0.0025 inches for a fully extended four foot ram, even this small error is detrimental to accurate machining. The error increases when a boring bar or second tool support arm is extended outwardly from the ram. A boring bar which is extendible approximately seven feet outwardly from the ram may deflect as much as 0.0152 inches relative to the ram. The total deflection of the fully extended ram and boring bar would be 0.0177 inches. In addition, the total deflection of the ram itself is increased when a relatively heavy right angle drive attachment is connected with the outer end of the ram. Of course the actual ram and boring deflection will be different for different machine tools.

In order to correct for deflection of extendible tool supports, it has been suggested that the saddle or carriage on which the ram is mounted be raised to compensate for the error induced by the downward deflection of the outer end portion of the ram in the manner disclosed in U.S. Pat. No. 3,827,333. This ram deflection compensation method is ineffective to maintain the cutting face of a tool in a desired plane. This is because as the ram deflects downwardly, the axis of rotation of the cutting tool is deflected so that the cutting tool rotates about an axis which is skewed.

It has also been suggested that a brace assembly be utilized to support the outer end portion of the extendible tool support in the manner disclosed in U.S. Pat. No. 3,097,568. Other devices for use in positioning cutting tools having various supporting arrangements are disclosed in U.S. Pat. Nos. 2,798,773; 3,027,813; 3,211,025; 3,233,521; and 3,339,253.

SUMMARY OF THE PRESENT INVENTION

The present invention provides a new and improved method and apparatus to compensate for deflection of an extendible tool support arm or ram. To compensate for the deflection of the tool support arm, the tool support arm is moved to maintain the cutting plane of a tool on the outer end portion of the arm in a predetermined working orientation even though the tool support arm deflects downwardly under the influence of gravity. This is accomplished by changing the angular orientation of the tool support arm.

The angular orientation of the tool support arm is changed by actuating suitable deflection compensation cams to pivot a tool support arm carriage or saddle relative to upwardly extending tracks as the tool support arm is extended. In order to correlate the extent to which the angular orientation of the tool support arm is modified with the extent to which the tool support arm deflects as it is extended, data corresponding to the amount of deflection of the tool support arm at various positions as it is extended is stored by cams. The cams are read by transducers as the tool support arm is extended. The transducers effect actuation of control circuitry to actuate the deflection compensation cams to vary the angular position of the tool support arm carriage by an amount corresponding to the data representative of the deflection of the tool support arm.

Accordingly it is an object of this invention to provide a new and improved method and apparatus for compensating for the deflection of an extended tool support arm to maintain the cutting plane of a tool mounted on the outer end portion of the tool support arm in a predetermined orientation.

Another object of this invention is to provide a new and improved method and apparatus for compensating for the deflection of a pair of tool support arms by storing data which is indicative of the deflection of the tool support arms and moving the tool support arms as they are extended to thereby offset the downward deflection of the tool support arms.

Another object of this invention is to provide a new and improved method and apparatus for compensating for the deflection of a tool support arm by changing the angular orientation of the tool support arm as it is extended.

BRIEF DESCRIPTION OF THE DRAWINGS

The foregoing and other objects and features of the present invention will become more apparent upon a consideration of the following description taken in connection with the accompanying drawings wherein:

FIG. 14 is a schematic illustration of control circuitry utilized in association with the deflection compensation assembly of FIG. 8; and FIG. 15 is a schematic illustration of motor control circuitry utilized in association with the circuitry of FIG. 14.

DESCRIPTION OF ONE SPECIFIC PREFERRED EMBODIMENT OF THE INVENTION

Figure 1:
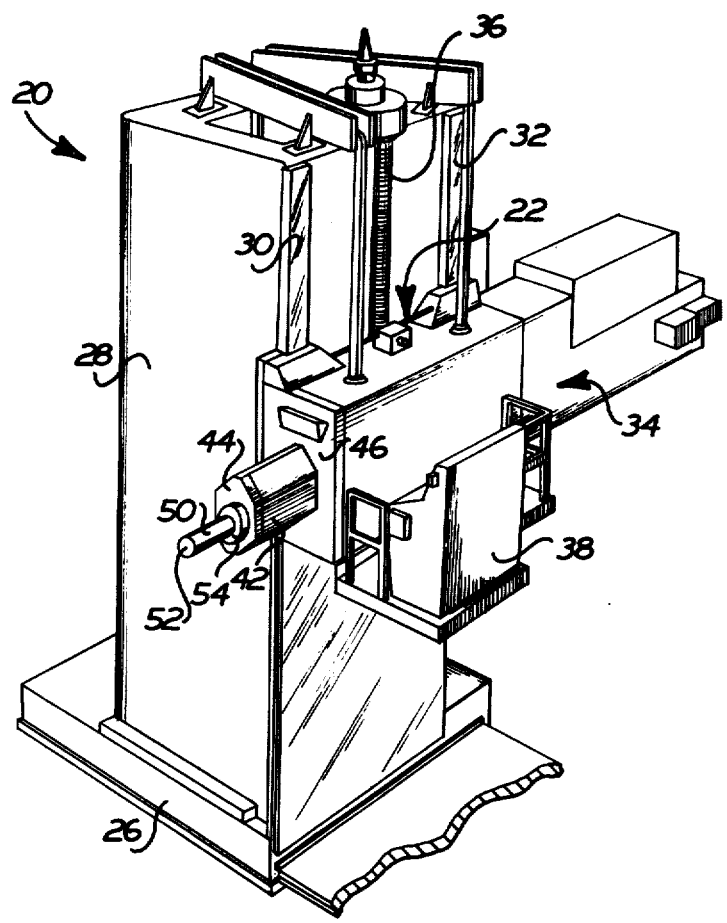
FIG. 1 is a pictorial illustration of a portion of a horizontal boring, milling and drilling machine having tool support arm deflection compensation in accordance with the present invention.

A horizontal boring, milling and drilling machine 20 having a support arm deflection compensation assembly 22 is illustrated in FIG. 1. The horizontal boring, milling and drilling machine includes a saddle 26 which is mounted on and movable along horizontal bedways (not shown) in a known manner. A vertical column 28 extends upwardly from the base saddle 26 and has vertically extending tracks 30 and 32 along which a tool support saddle or carriage 34 is moved under the influence of an elevating screw 36. An operator's control console 38 is mounted on the saddle 34 and moves up and down with the saddle.

A longitudinally extending ram or first tool support arm 42 is movable between a retracted position in which an outer end portion or nose 44 of the ram is closely adjacent to a side 46 of the saddle 34 and an extended position in which the ram projects outwardly for a substantial distance from the saddle. A cylindrical boring bar 50 is telescopically mounted on the ram 44 and has an outer end portion 52 for engaging a suitable tool. The boring bar 50 is telescopically movable between a retracted position which the outer end portion of the boring bar is closely adjacent to a drive spindle 54 on the outer end of the ram 42 and an extended position which the outer end 52 of the boring bar is located a substantial distance outwardly from the ram 42.

Although the boring bar 50 and ram 42 could have many different lengths, in one specific preferred embodiment of the invention the ram 42 extends outwardly from the carriage 34 for a distance of approximately four feet when the ram is fully extended. When boring bar 50 is fully extended it projects outwardly from the ram 42 by a distance of approximately seven feet. It should be understood that the foregoing specific lengths of the ram 42 and boring bar 50 are for purposes of clarity of illustration rather than limitation.

Although it is contemplated that many different types of tools could be utilized in association with the ram 42, it is a common practice to utilize a face milling cutter 58 (FIG. 2) in association with the ram. The face milling cutter 58 has a plurality of blades or cutting teeth which are mounted on a circular body in a known manner. Of course other known types of cutting tools could be utilized if desired.

When the face milling cutter 58 (FIG. 2) is to be utilized, the boring bar 50 (FIG. 1) is removed from the ram 42 and the body of the face milling cutter is engaged by the chuck 54. During use of the face milling cutter 58, the chuck 54 rotates the cutter about a central axis 60 (FIG. 2) which is coincident with the longitudinal central axis of the ram 42. The blades of the face milling cutter have cutting edges which are disposed in a cutting plane 64. When the face milling cutter 58 is to be used to finish a vertically extending surface 66, the axis of rotation 60 of the face milling cutter should extend perpendicular to the vertical surface 66 so that the cutting plane 64 is parallel to the vertical surface. This enables the blades or teeth of the face milling cutter to remove metal in a vertical plane as the milling cutter is rotated about the axis 60.

When the ram 42 is extended, the free outer end of the ram tends to droop or deflect under the influence of gravity. This deflection results in the outer end portion 44 of the ram being disposed downwardly from the inner end portion of the ram which is supported by the carriage 34. Due to the downward deflection of the ram 42, the longitudinal central axis 60 of the ram will curve the manner illustrated schematically in FIG. 3. It should be understood that the ram is relatively rigid so that the outer end portion sags to only a relatively small extent even when the ram is fully extended and that the curvature of the central axis 60 of the ram has been exaggerated in FIG. 3 for purposes of clarity of illustration.

Figure 3:
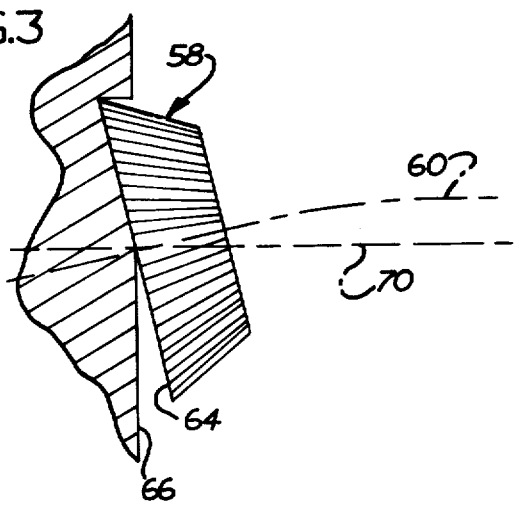
FIG. 3 is an exaggerated schematic illustration of the manner in which the milling cutter of FIG. 2 engages a workpiece when it is disposed on a deflected tool support arm.

Even a small deflection of the outer end portion 44 of the ram 42 results in the axis of rotation of the face milling cutter being skewed relative to an axis 70 extending perpendicular to the surface 66 of the workpiece. This results in the cutting plane 64 of the milling cutter 58 being offset from a vertical plane so that the upper portion of the rotating milling cutter 58 cuts into the workpiece in the manner illustrated schematically in FIG. 3. The lower portion of the face milling cutter 58 is offset from the vertical side surface 66 of the workpiece. Of course, having the cutting plane 64 of the milling cutter 58 offset from the vertical plane in the manner illustrated schematically in FIG. 3 is detrimental to the obtaining of a smooth accurate finish on the side surface 66 of the workpiece.

Figure 2:
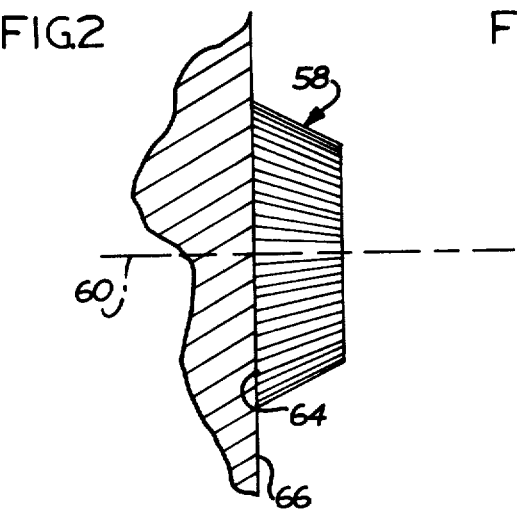
FIG. 2 is a schematic illustration depicting the desired manner of engagement of a milling cutter with a workpiece as the cutter is being rotated about a horizontal axis.

In addition to being utilized to finish vertically extending surfaces, right angle drive or swivel attachments can be provided for the ram 42 to enable the machine 20 to be utilized to finish surfaces disposed in planes other than a vertical plane. When such an attachment is utilized, the face milling cutter 58 can be rotated about a vertical axis 60 (FIG. 4) which extends perpendicular to the horizontal central axis 74 of the ram 42 rather than being coincident with this axis as shown in FIG. 2. When such an attachment is used, the cutting plane 64 of the face milling cutter 58 extends perpendicular to a vertical plane and is capable of finishing a horizontal surface 78 of the workpiece in the manner shown in FIG. 4.

The right angle drive attachment has considerable weight and is effective to accentuate the deflection of the ram 42 when it is extended. Thus, when the ram 42 is extended, the central axis 74 of the ram is deflected downwardly under the influence of both the weight of the ram and the weight of the drive attachment. This results in the axis of rotation 60 of the face milling cutter 58 being skewed relative to a vertical axis. Therefore, the cutting plane 64 of the face milling cutter 58 is offset from the horizontal plane in the manner illustrated schematically in FIG. 5. The outer portion of the face milling cutter 58 will cut into the horizontal surface 78 of the workpiece while the inner portion of the face milling cutter will be spaced apart from the surface. This results in an undesirable finish of the same type obtained when the axis of rotation 60 of the face milling cutter 58 is offset from a horizontal axis 70 in the manner illustrated in FIG. 3.

Figure 6:
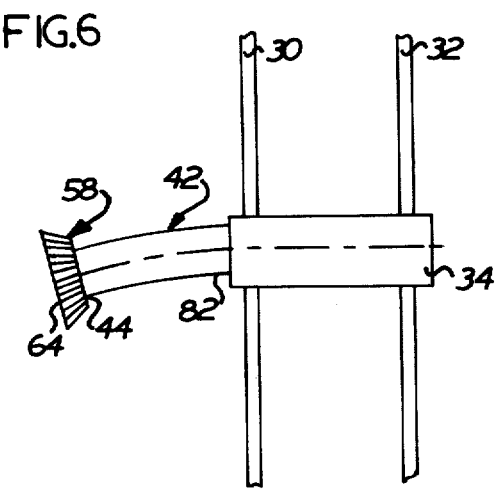
FIG. 6 is an exaggerated schematic illustration depicting the manner in which a tool support arm deflects to cause a milling cutter to engage a workpiece in the manner shown in FIG. 3.

The manner in which the ram 42 deflects under the influence of gravity when the ram is fully extended is illustrated schematically in FIG. 6. The outer end portion 44 of the ram is disposed lower than the inner end portion 82 of the ram. When the ram 42 is deflected as illustrated in FIG. 6, the cutting plane 64 of the face milling cutter is skewed relative to a vertical plane in the manner illustrated in FIG. 3. However as the ram 42 is retracted and the face milling cutter 58 moves back toward the carriage 34, the deflection of the ram decreases. This results in the cutting plane 64 of the face milling cutter 58 gradually approaching a vertical plane. When the ram 42 is close to the fully retracted position in which the face milling cutter 58 is closely adjacent to the carriage 34, the cutting plane 64 has a vertical orientation and the milling cutter 58 is effective to finish a workpiece in the manner illustrated schematically in FIG. 2.

In accordance with a feature of the present invention, the tool support arm deflection compensation assembly 22 is effective to compensate for the bowed configuration of the fully extended arm 42 to locate the cutting plane 64 of the milling cutter 58 in a vertical plane even when the ram is fully extended. This is accomplished by changing the angular orientation of the ram 42 relative to the vertical plane of the workpiece surface 66. To change the angular orientation of the ram 42 relative to the workpiece surface 66, the ram is pivoted in a clockwise direction from the position shown in FIG. 6 so that the inner end portion 82 of the ram is effectively lowered relative to the outer end portion 44 of the ram in the manner illustrated schematically in FIG. 7.

The pivoting movement of the ram 42 is accomplished by changing the angular orientation of the saddle or carriage 34 relative to the upwardly extending tracks 30 and 32. Thus, the tool support arm deflection compensation assembly 20 is effective to rotate the carriage 34 from the position shown in FIG. 6 to the position shown in FIG. 7. When the carriage 34 has been rotated to the position shown in FIG. 7, the cutting plane 64 of the milling cutter 58 is vertical. The milling head 58 can then engage the vertical side surface 66 of a workpiece in the manner shown in FIG. 2 to smoothly and accurately finish the workpiece even though the ram 42 is deflected.

Although the tool support arm deflection compensation assembly 20 changes the angular orientation of the ram 42 by pivoting the carriage 34, it is contemplated that under certain circumstances it may be desirable to change the angular orientation of the ram 42 without changing the angular orientation of the carriage. This could be accomplished by actuating ram support elements disposed on the carriage 34 to pivot the ram 42 relative to the carriage.

Figure 7:
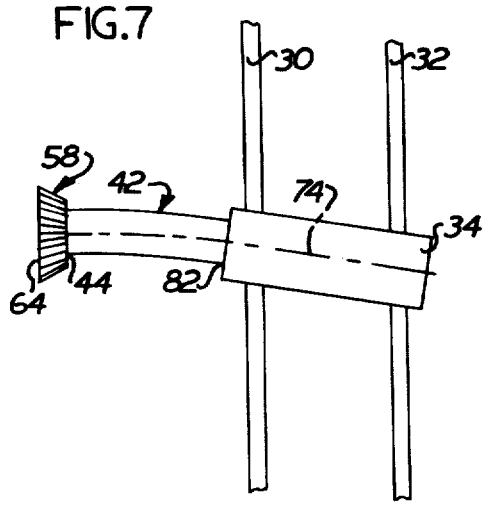
FIG. 7 is an exaggerated schematic illustration, similar to FIG. 6, illustrating the manner in which the angular orientation of the tool support arm is changed to cause the milling cutter to engage a workpiece in the manner shown in FIG. 2 even though the tool support arm is deflected.

The tool support arm deflection compensation assembly 20 also compensates for deflection of the ram 42 when it is utilized to finish a horizontal surface. A right angle drive or swivel attachment is connected with the outer end portion of the ram to orient the milling cutter 58 in the manner shown in FIGS. 4 and 5. A change in the angular orientation of the ram 42 relative to the tracks 30 and 32 by pivoting the carriage 34 results in the axis of rotation 60 of the milling cutter 58 being moved from the orientation shown in FIG. 5 to the orientation shown in FIG. 4. This enables the cutter 58 to accurately finish the workpiece even though the ram 42 remains deflected or bowed and the central axis 74 of the ram has an arcuately curving configuration as shown in FIGS. 5-7.

When the boring bar 50 is to be used, the boring bar extends outwardly from the end of the ram 42. Since the boring bar 50 is substantially longer than the ram 42 and is not as heavily constructed, the deflection of the fully extended boring bar 50 relative to the ram 42 is greater than the deflection of the fully extended ram relative to the carriage. The outer end portion 52 of the boring bar 50 deflects relative to the carriage 34 by an amount equal to the sum of deflection of the outer end portion 44 of the ram relative to the carriage 34 and the deflection of the outer end portion 52 of the boring bar 50 relative to the outer end of the ram. Of course the total deflection of the outer end portion of the boring bar 52 will decrease as either the ram 42 or the boring bar 50 are retracted from their fully extended positions.

In order to compensate for deflection of the boring bar 50, it is necessary to change the angular orientation of both the ram 42 and the boring bar 50 relative to the upwardly extending tracks 30 and 32. Although this could be accomplished in many different ways, the tool support arm deflection compensation assembly 22 compensates for the total deflection of both the ram 42 and boring bar 50 by pivoting the carriage 34 relative to the vertically upwardly extending tracks 30 and 32. Since the extent of deflection of the outer end portion of the boring bar 50 increases as the ram 42 and boring bar 50 are extended, the extent of rotation of the carriage 34 relative to the tracks 30 and 32 is adjusted as the ram 42 and boring bar 50 are extended.

Figure 8:
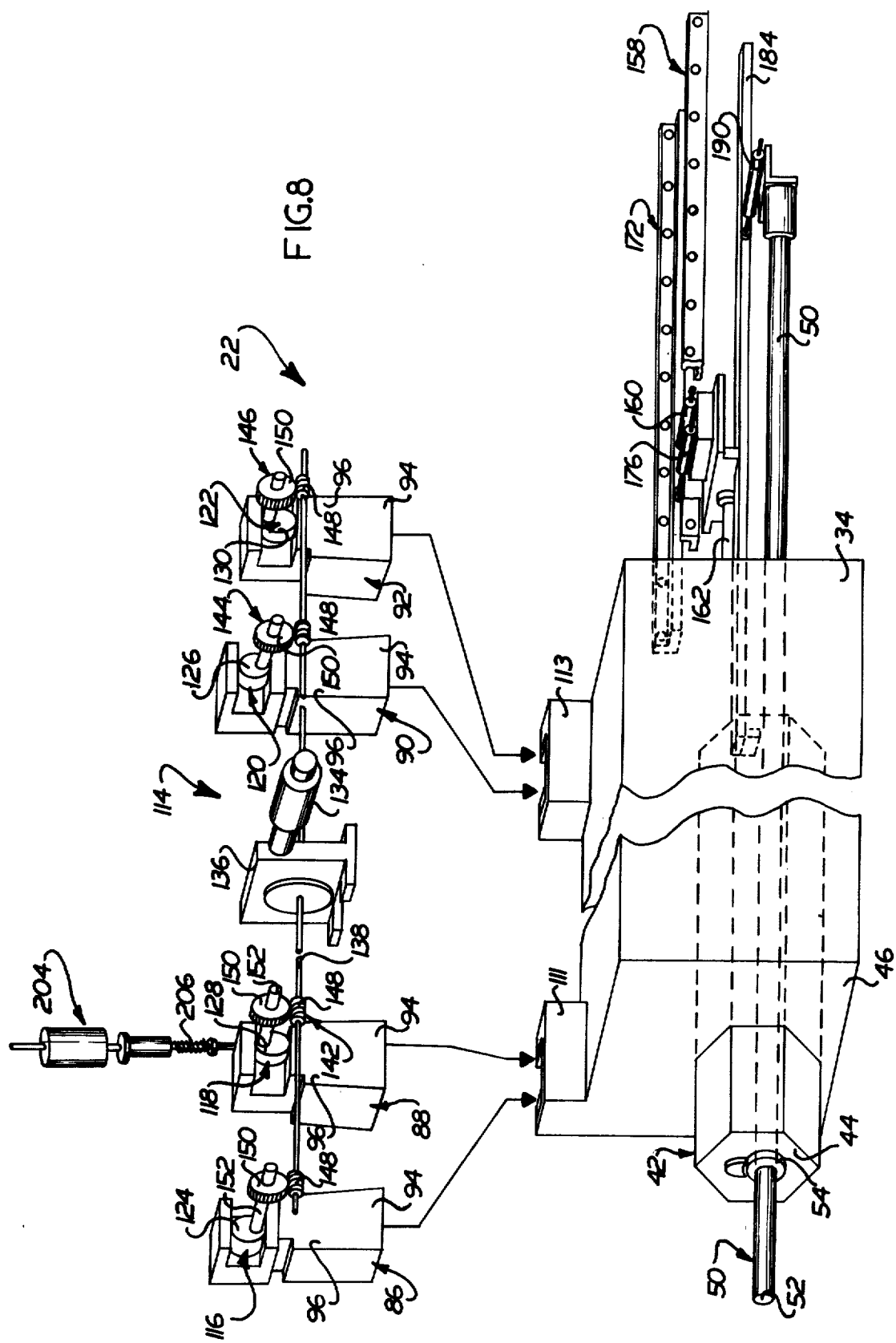
FIG. 8 is a partially broken away schematic illustration of a tool support arm deflection compensation assembly.

The construction of the tool support arm deflection compensation assembly is illustrated in FIGS. 8-13. Specifically, the tool support arm deflection compensation assembly 22 includes four longitudinally extending deflection compensation cams or gibs 86, 88, 90 and 92 (FIG. 8). The two gibs or cams 86 and 88 are disposed on opposite sides of the outwardly extending track 30 in the manner illustrated in FIG. 10. Similarly, the cams 90 and 92 are disposed on opposite sides of the upwardly extending track 32. As the ram 42 and/or tool bar 50 are extended, the cams 86, 88, 90 and 92 are moved vertically along the opposite longitudinally extending sides of the tracks 30 and 32 to pivot the carriage 34 from the orientation shown in FIG. 6 toward the orientation shown in FIG. 7 at a rate which corresponds to the rate at which the ram and/or boring bar are extended. To effect this movement of the carriage 34 relative to the tracks 30 and 32, the longitudinally tapered cams 86 and 90 (FIG. 8) are moved vertically downwardly while the longitudinally extending cams 88 and 92 are moved vertically upwardly. The cams 86, 88, 90 and 92 taper upwardly from relatively large lower end portions 94 to relatively small upper end portions 96. Therefore, moving the cam 86 downwardly from the position shown in FIG. 10 tends to cause a gap to occur between the wedging surface 100 on a wedge member 102 and a upwardly extending side surface 104 of the cam 86. It should be noted that the wedge member 102 is disposed in abutting engagement with the track 30 and is connected with a frame member 108 of the carriage 34.

However, the frame member 108 and the remainder of the carriage 34 are movable sidewardly relative to the wedge member 102.

Figure 10:
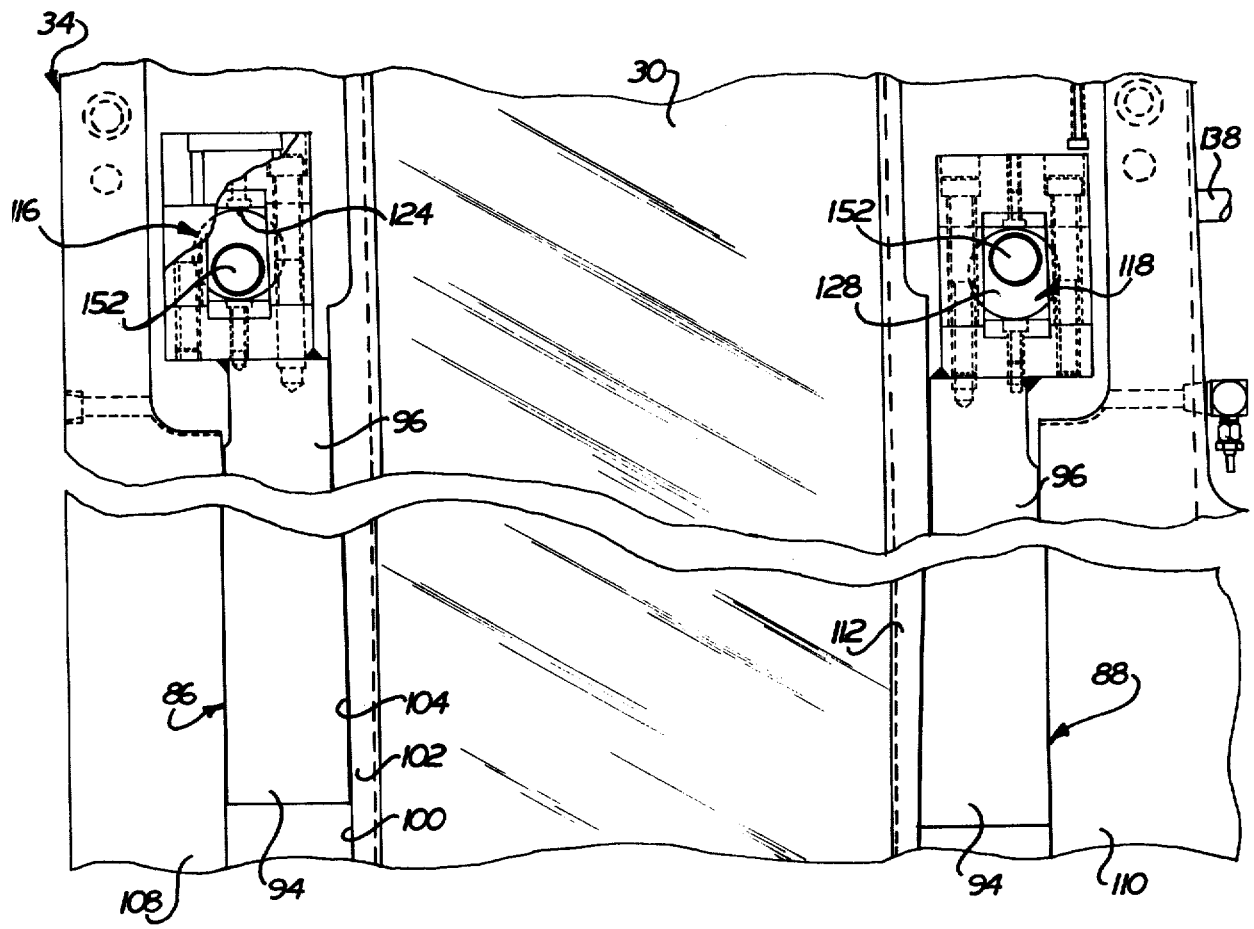
FIG. 10 is a broken away view illustrating the relationship between a deflection compensation gib or cam and an actuator cam utilized in the deflection compensation assembly of FIG. 8.
Figure 11:
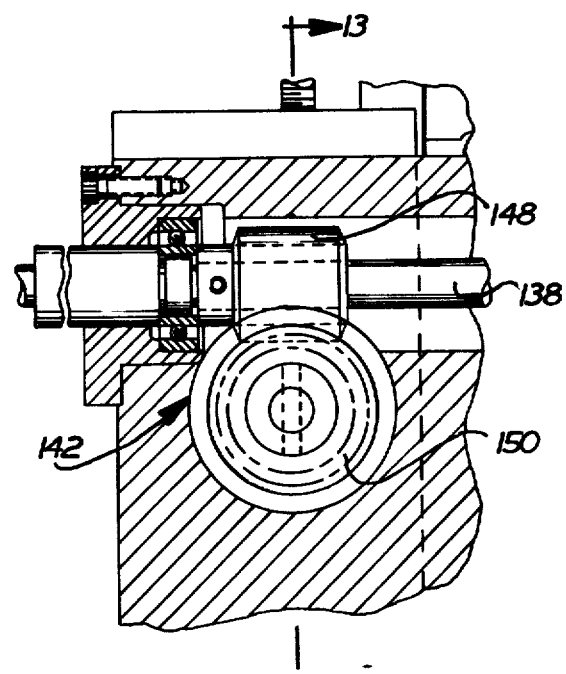
FIG. 11 is a fragmentary sectional view of a portion of a drive to the actuator cams.
Figure 12:
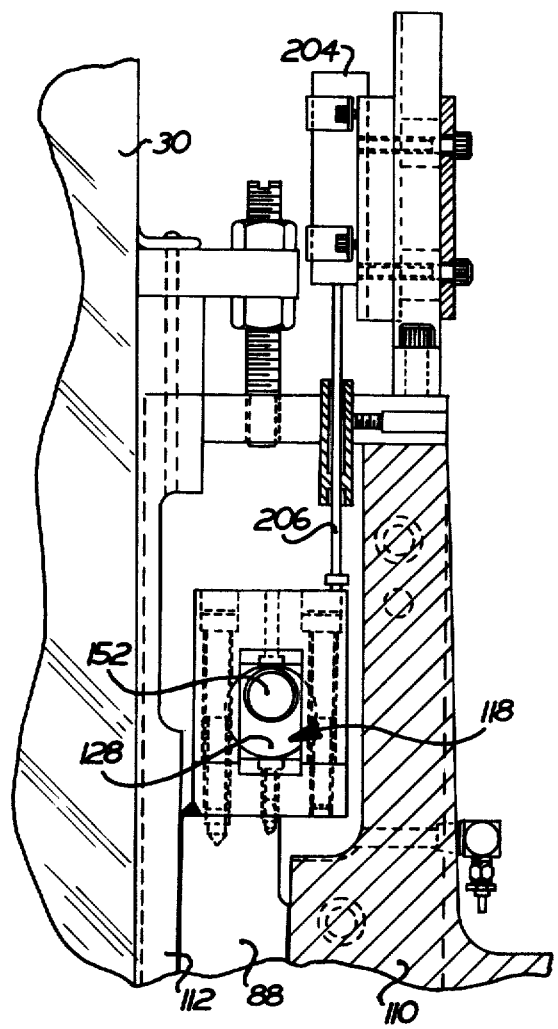
FIG. 12 is a fragmentary sectional view depicting the relationship between a deflection compensation cam, actuator cam, and feedback apparatus.
Figure 13:
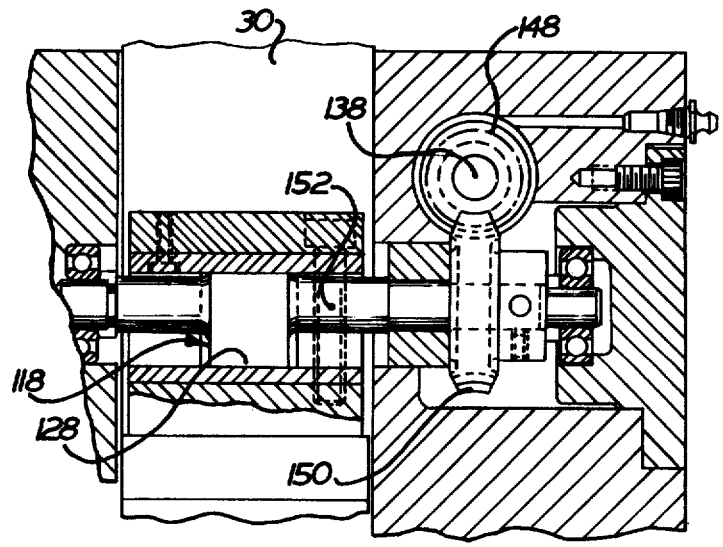
FIG. 13 is a fragmentary sectional view taken along the line 13—13 of FIG. 11 further illustrating the actuator cam and its drive.

Upward movement of the longitudinally tapered cam 88 from the position shown in FIG. 10 causes the cam to press a frame member 110 of the carriage 34 toward the right (as viewed in FIG. 10). The cam 88 presses against a second wedge member 112 which, like the wedge member 102, is disposed in engagement with the track 30 and is connected with the carriage 34 in such a manner as to allow total movement of the carriage relative to the wedge member. Thus, lowering of the cam 86 is effective to release the carriage 34 for movement relative to the track 30 and raising of the cam 88 is effective to move the carriage toward the right as viewed in FIG. 10. Although only the cams 86 and 88 have been shown in FIG. 10, it should be understood that the cams 90 and 92 cooperate with the carriage 34 and track 32 in the same manner.

The cams 86, 88, 90 and 92 are mounted adjacent upwardly projecting portions 111 and 113 at the top of the carriage 34 (see FIG. 8). Since merely shifting the carriage toward the right relative to the tracks 30 and 32 would be ineffective to change the angular orientation of the carriage 34 relative to the tracks, the carriage is connected with the tracks in a manner such that shifting of the upper portion of the carriage toward the right (as viewed in FIG. 8) results in pivotal movement of the carriage about a horizontal central axis extending perpendicular to the central axis 74 of the ram 42. This is accomplished by providing a slight degree of pivotal movement at a drive nut interconnecting the carriage and the elevating screw 36. In addition, the guide surfaces for engaging opposite longitudinally extending sides of the tracks 30 and 32 are mounted for pivotal movement.

The drive arrangement 114 (see FIG. 8) for raising and lowering the cams 86, 90, 88 and 92 includes actuator cams 116, 118, 120 and 122. The actuator cams 116 and 120 which are effective to cause downward movement of the deflection compensation cams 86 and 90 have nose portions 124 and 126. The cam nose portions 124 and 126 are disposed in the upwardly projecting orientation shown in FIGS. 8 and 10 when the carriage 34 is oriented with its central axis extending perpendicular to the central axis of the tracks 30 and 32 (see FIG. 6). At this time the nose portions 128 and 130 of the actuator cams 118 and 122 extend downwardly.

When the angular orientation of the ram 42 is to be changed, the actuator cams 116 and 120 are rotated to lower their nose portions 124 and 126. This lowers the deflection compensation cams 86 and 90. At the same time, the actuator cams 118 and 122 are rotated to raise their nose portions 128 and 130. This raises the deflection compensation cams 88 and 92.

To initiate rotation of the actuator cams 116, 118, 120 and 122, a motor 134 (see FIG. 9) is energized to actuate a speed reducing gear assembly 136. The gear assembly 136 is drivingly connected with the actuator cams 116, 118, 120 and 122 by means of a drive shaft 138 and pinion gear drive arrangements 140, 142, 144 and 146. Each of the drive arrangements 140, 142, 144 and 146 includes a worm 148 which drives a gear 150 fixedly connected with the associated cam by means of a shaft 152. Each of the actuator cams is rotatable about the horizontal central axis of an associated shaft 152. The central axes of the shafts 152 extend perpendicular to the central axis 74 of the ram and to the central axes of the tracks 30 and 32.

When the ram 42 is extended, the extent of deflection of the outer end portion 44 of the ram varies as a direct function of the extent which the ram projects outwardly from the carriage 34. Since the deflection of the ram 42 is due to a generally uniformly distributed load per unit length of the ram, the deflection for the ram 42 will be similar to the deflection of a cantilever beam. Therefore the extent of deflection of the ram varies as a function of the fourth power of variations in the distance to which the ram extends outwardly from the carriage 34.

Due to the relatively complex structure of the ram 42 and its support arrangement, the deflection of the outer end portion 44 of the ram was measured at each of a plurality of positions as the ram was moved from a fully retracted position to a fully extended position. Although the extent of deflection of the ram 42 could be measured with the ram in many different extended positions, in one specific instance the extent of deflection of a four foot ram 42 was measured at one foot intervals. However, it should be understood that the extent of deflection of the ram could be measured at different intervals if desired.

Figure 9:
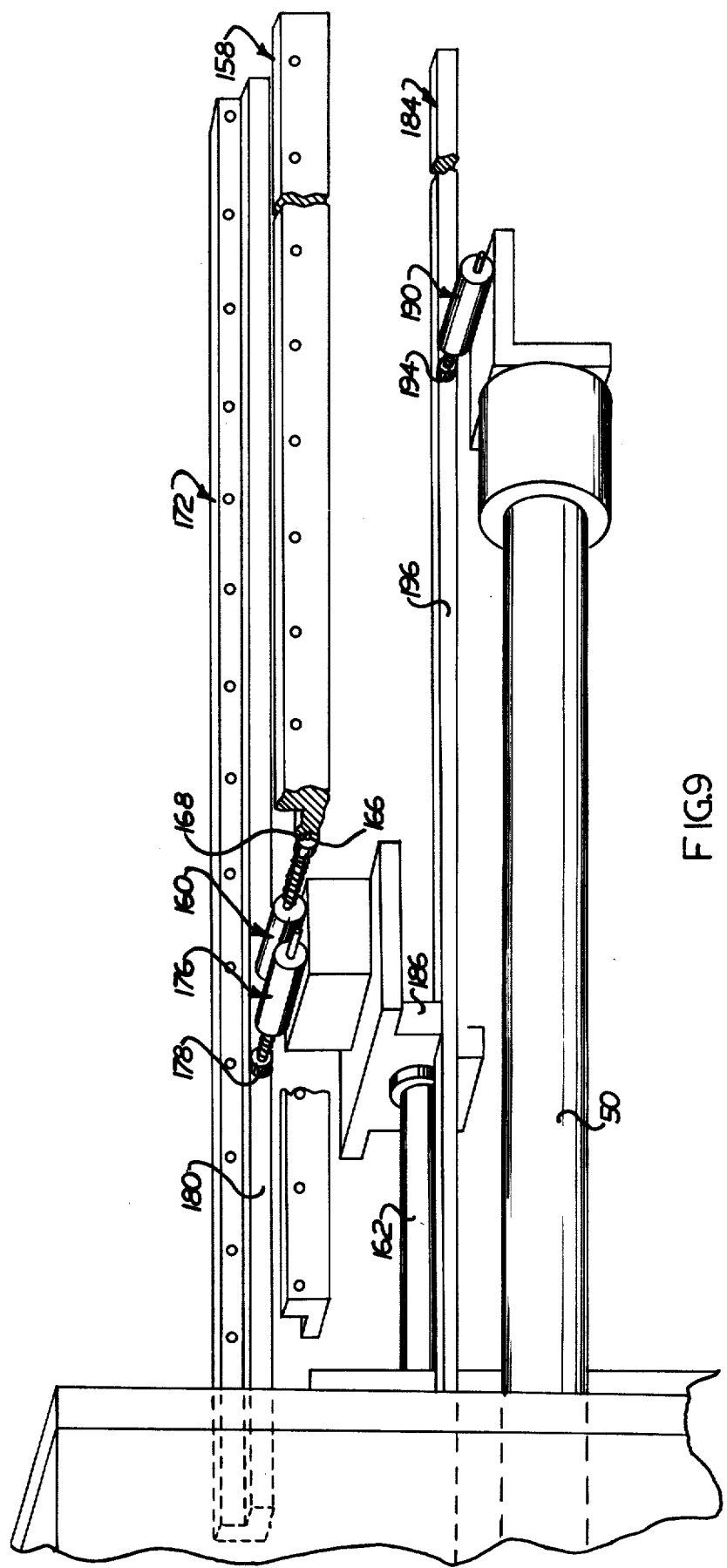
FIG. 9 is an enlarged portion of FIG. 8 illustrating cams which are utilized to store data corresponding to the extent of deflection of the tool support arm as it is moved between a retracted position and an extended position.

Once the deflection for the ram 42 at each of a plurality of positions between the retracted and the extended positions has been determined, it is necessary to first store the data and then utilize the stored data to effect movement of the deflection cams and a corresponding change in the angular orientation of the ram 42 to compensate for the deflection of the ram. Although the data could be stored in many different ways, in a specific preferred embodiment of the invention, the data was stored by calibrating a linear cam 158 (FIGS. 8 and 9). The cam 158 is fixedly connected to a housing which extends outwardly from the carriage 34 so that the cam 158 does not move relative to the carriage.

As the ram 42 is moved between the retracted and extended positions, the cam 158 is read by a cam deflection transducer 160. The transducer 160 is connected with the ram by a bar 162 so as to move linearly with the ram 42. Due to the linear relationship between movement of the ram deflection transducer 160 and the ram 42, the cam 158 has a length which is equal to the maximum work stroke of the ram 42. In the specific preferred illustrated embodiment of the invention described herein the ram has a maximum work stroke of approximately four feet and the cam 158 has a length of approximately four feet.

The cam 158 has a cam surface 166 (FIG. 9) which is engaged by a transducer cam follower 168. The cam surface 166 is accurately calibrated at one foot intervals to store the measured deflection data for the ram 42. In accordance with known cam construction techniques, the cam surface 166 was shaped to provide a smooth interconnection between the accurately calibrated one foot interval positions. Of course, the cam could be calibrated for many more positions if desired. In addition other types of cams could be used other than the linear cam 158. For instance a rotary cam could be utilized if desired. Although the cam 158 provides a relatively inexpensive and simple way of storing the data corresponding to the deflection of the ram 42, it is contemplated that a computer program could be utilized to store the data and effect actuation of the deflection compensation cams 86, 88, 90 and 92 to vary the angular orientation of the ram 42 as it is extended.

Figure 4:
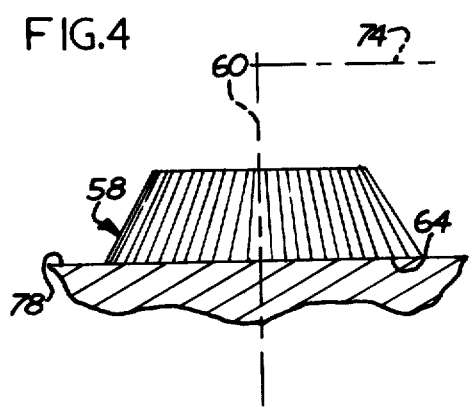
FIG. 4 is a schematic illustration of the desired manner of engagement of a milling cutter with a workpiece when a right angle drive attachment is used to effect rotation of the milling cutter about a vertical axis.
Figure 5:
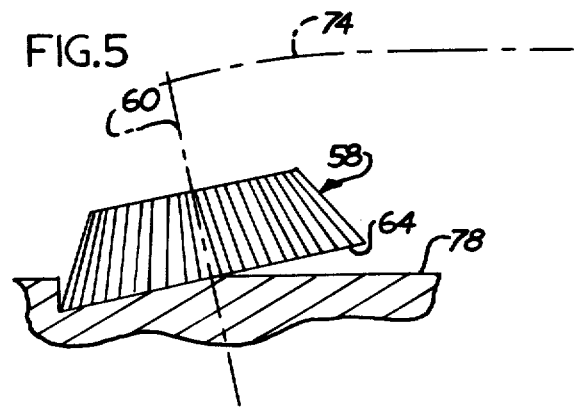
FIG. 5 is an exaggerated schematic illustration of the manner in which the milling cutter of FIG. 4 engages the workpiece when it is disposed on a deflected tool support arm.

When a right angle drive or swivel attachment is connected with the outer end of the ram 42 to drive a milling cutter 58 in the manner shown in FIGS. 4 and 5, substantial weight is added to the outer end portion of the ram. Of course, the addition of this weight will affect the deflection of the ram. Therefore data corresponding to the deflection of the ram 42 and drive attachment must be obtained and stored. To this end, the ram 42 is actuated between the retracted and extended positions with the right angle drive attachment mounted on the outer end of the ram and the actual deflection of the ram is measured at each of a plurality of positions. A ram and attachment compensation cam 172 is utilized to store the measured deflection compensation data for the combination of the ram and attachment.

The cam 172 (FIGS. 8 and 9) is fixedly connected with the carriage 34 and is read by a transducer 176. The transducer 176 is connected with the ram 42 by the bar 162 for movement with the ram. As the transducer 176 is moved with the ram, a follower 178 (FIG. 9) engages a cam surface 180 of the cam 172 to actuate the transducer 176 and provide an output which varies in accordance with the data stored by the cam 172. It is contemplated that other known types of data storage arrangements could be utilized other than the linear cam illustrated in FIGS. 8 and 9 of the drawings.

When the boring bar 50 is utilized in association with the ram 42, the deflection of the outer end portion 52 of the boring bar 50 is equal to the sum of a deflection of the outer end portion of the ram 42 relative to the carriage 34 and the deflection of the outer end portion of the boring bar 50 relative to the outer end of the ram. In order to determine the deflection of the outer end of the boring bar 50 relative to the outer end of the ram, the boring bar is moved to a fully retracted position in which the outer end portion 52 of the boring bar is closely adjacent to the outer end portion 44 of the ram. The boring bar is then moved through a plurality of positions to the fully extended position. The actual deflection of the boring bar relative to the outer end of the ram is measured as the boring bar is moved to each of the plurality of positions.

The extent of deflection of the boring bar can be determined at many different intervals. However in one specific instance in which a seven foot boring bar was utilized, the deflection of the outer end of the boring bar relative to the outer end of the ram was measured at one foot intervals as the boring bar was moved from the fully retracted position to the fully extended position. Of course, the extent of deflection of the boring bar relative to the ram could be measured at any number of positions as the boring bar is extended.

The measured data for deflection of the boring bar relative to the ram is stored by a cam 184. The cam 184 is connected with the ram 42 for movement therewith relative to the carriage 34. Thus, the cam 184 is connected with a transducer carrier 186 and connected with the bar 162 which is moved by the ram as it is moved between its extended and retracted positions. Therefore the position of the cam 184 relative to the carriage 34 will vary as the ram 42 is extended.

The cam 184 is read by a transducer 190. The transducer 190 is connected with the boring bar 50 (see FIG. 9) for movement therewith relative to the carriage 34 and ram 42. The transducer 190 is provided with a cam follower 194 which engages a cam surface 196 having a configuration determined by the measured deflection of the outer end portion of the boring bar relative to the ram. It should be understood that the cam 184 has an overall length which is equal to the length of the maximum length of the boring bar 50 relative to the ram 42. Although linear cams 158, 172 and 184 have been illustrated in the drawings, in one specific embodiment of the invention generally circular rotary cams were utilized. The rotary cams provided more rigid alignment between the cams and the transducers and facilitated installation of the cams.

Control circuitry 200 is utilized in association with the data storage and reading apparatus of FIG. 9 and the cam drive 114 of FIG. 8. The control circuitry 200 includes the transducer 160 which reads the cam 158 to determine the deflection of the ram when it is being utilized without a right angle drive attachment. The transducer 160 is connected with the transducer 190 which reads the boring bar deflection cam 184. These two transducers are connected with the transducer 176 which reads the deflection for the ram with a right angle drive attachment. In addition, a cam position feedback transducer 204 is connected with the three cam reading transducers.

The transducer 204 (see FIG. 12) is mounted on the carriage frame member 110 and is connected with the deflection compensation cam or gib 88 by means of a connector rod 206. Since all four deflection compensation cams 86, 88, 90 and 92 are driven to the same extent by a common drive arrangement 114, the output from the transducer 204 is indicative of the position of all the cams at their initial or starting positions. Of course, the cams 86 and 90 are lowered from the initial or starting position while the cams 88 and 92 are raised.

When the ram 42 is to be used without a right angle drive attachment and without the boring bar 50, the contacts 210 are closed and the contacts 212 are opened (as shown in FIG. 14) to deactivate transducer 176. Although the transducer 190 remains active, its output does not change since the bar 50 is not moved relative to the ram 42. At this time a position signal from the transducer 204 indicating the actual position of the deflection compensation cam 88 is subtracted from the commanded position for the deflection compensation cam as determined by output from the transducer 160. The difference between the signals from the transducers 160 and 204 is transmitted to a phase sensitive detector and amplifier 216 as an error signal. The amplitude of an output signal from the detector 216 is proportional to the total error in the position of the deflection compensation cam 88 relative to the position commanded by the transducer 160. The polarity of the output signal from the detector determines the direction of the error.

If the cam 88 is below a position corresponding to the output from the transducer 160, a positive polarity error signal is transmitted from the amplifier 216 over a lead 220 to effect energization of a relay coil 222. Similarly, if the cam 88 is above a position corresponding to the output from the transducer 160, a positive polarity error signal is transmitted to a lead 224 to effect energization of a relay coil 226. Relays 222 and 226 effect operation of the cam drive motor 134 (see FIGS. 8 and 15) to either raise or lower the deflection compensation cams depending upon the polarity of the error signal.

Assuming that the ram 42 is being extended and the deflection of the ram is increasing, the output from the transducer 160 increases. Therefore, subtracting the feedback signal from the transducer 204 from the output of the transducer 160 results in a negative polarity output signal on the lead 224. The relay 222 is energized to close normally open relay contacts 230, 232 and 234 (FIG. 15). This effects energization of the motor 134 to rotate the actuator cams 116, 118, 120 and 122 to lower the deflection compensation cams 86 and 90 and raise the deflection compensation cams 88 and 92.

As the cams 86 and 90 are lowered and the cams 88 and 92 are raised, the ram 42 is swung in a clockwise direction away from the orientation shown in FIG. 6 toward the orientation shown in FIG. 7. When the cutting plane 64 is vertical, the output signal from the feedback transducer 204 offsets the output signal from the transducer 160 and the relay 222 is deenergized to interrupt pivotal movement of the ram 42. It should be noted that the ram 42 is being continuously moved as it is being extended so that the cutting plane 64 remains substantially vertical as the ram is extended. Therefore the condition illustrated in FIG. 6 does not occur. However if desired, the ram 42 could be moved to an extended position and then pivoted to correct for deflection of the ram.

When the ram 42 is being retracted and the deflection of the ram is decreasing, the output from the transducer 160 decreases. Therefore subtracting the feedback signal from the transducer 204 from the output of the transducer 160 results in a positive polarity output signal on the lead 224. This signal energizes the relay 226. Energization of the relay 226 closes its normally open contacts 238, 240 and 242 (FIG. 15) to effect operation of the motor 134 to raise the deflection compensation cams 86 and 90 and lower the deflection compensation cams 88 and 92. Although only the contacts for effecting energization of the motor 134 have been illustrated in FIG. 15, it is contemplated that suitable relay amplification will be associated with the relay coils 222 and 226 along with suitable interlock contacts in a manner well known in the motor control art.

As the cams 86 and 90 are raised and the cams 88 and 92 are lowered, the ram is moved in a counterclockwise direction (as viewed in FIG. 7) to maintain the cutting plane 64 vertical. Upon interruption of retracting movement of the ram 42 with the cutting plane 64 vertical, their is a zero net output voltage from the secondary windings of the transducers 160 and 204. The zero error signal results in the relay 226 being deenergized to interrupt operation of the motor 134 and pivotal movement of the ram 42.

When the ram 42 is to be utilized with a right angle drive attachment, contacts 248 (FIG. 14) are opened and contacts 249 are closed to deactivate the transducer 160 and contacts 210 are opened and contacts 212 are closed to activate the transducer 176. This results in a comparing of the feedback signal from the transducer 204 with the output from the transducer 176. The detector 216 responds to the signals from the transducers 204 and 176 to effect movement of the deflection compensation cams 86, 88, 90 and 92 in the manner previously explained in connection with the transducer 160. Therefore, the motor 134 is energized to move the deflection compensation cams in accordance with the data stored by the cam 172 to change the annular orientation of the ram to compensate for deflection of the ram and right angle drive attachment.

When the boring bar 50 is to be utilized in association with the ram 42, the contacts 212 and 249 are opened and the contacts 248 and 210 are closed to activate the transducers 160 and 190 and deactivate the transducer 176. This results in the feedback signal from the transducer 204 being subtracted from the sum of the output from the transducer 160 which reads the ram deflection data stored by the cam 158 and the output from the transducer 190 which reads the boring bar deflection data stored by the cam 184. This results in the feedback signal from the transducer 204 being compared with both the ram deflection data and the boring bar deflection data to determine if the deflection compensation cams 86, 88, 90 and 92 have been moved in such a manner as to properly compensate for the combined deflection of the ram and boring bar. Of course, known control systems other than the one illustrated in FIGS. 14 and 15 could be utilized if desired.

In view of the foregoing description, it is apparent that the deflection compensation assembly 20 compensates for deflection of the extendible ram or tool support arm 42 by itself or in combination with a second deflectable tool support arm or boring bar 50. In addition, the deflection compensation assembly 20 is effective to compensate for deflection of the ram under the influence of a right angle drive attachment. It is contemplated that if desired, attachments having significantly different weights could be associated with the ram 42. If this was done, a separate deflection compensation cam, similar to the deflection compensation cam 172, would be provided for each of the attachments. In addition, it is contemplated that a relatively heavy attachment may be utilized in association with the boring bar 50. In this event a boring bar deflection compensation cam, similar to the cam 184, would be provided to compensate for deflection of the boring bar with an attachment on the outer end of the boring bar.

To compensate for deflection of the ram or tool support arm 42, the ram is moved to maintain the cutting face or plane 64 of a milling cutter 58 in a predetermined working orientation even though the ram 42 deflects downwardly under the influence of gravity. This is accomplished by changing the angular orientation of the ram 42. The angular orientation of the ram 42 is changed by actuating deflection compensation cams 86, 88, 90 and 92 to pivot the ram support carriage or saddle 34 relative to the upwardly extending tracks 30 and 32.

In order to correlate the extent to which the angular orientation of the ram 42 is modified with the extent to which the ram deflects as it is extended, data corresponding to the amount of deflection of the ram 42 is stored by a cam 158. The cam is read by a transducer 160 as the ram 42 is extended. The transducer in turn effects actuation of control circuitry 200 to effect actuation of a motor 134 to move the deflection compensation cams 86, 88, 90 and 92. Operation of the motor 134 varies the angular position of the carriage 34. Operation of the motor 134 is interrupted when a feedback signal indicates that the ram has been moved by an amount corresponding to the data stored by the cam 158 at each position of the ram.

To compensate for deflection of the ram or tool support arm 42 under the combined influence of its own weight and the weight of an attachment, the angular orientation of the ram is modified in accordance with data stored by the cam 172 and read by the transducer 176. To compensate for the deflection of the outer end of the boring bar 50, the angular orientation of both the boring bar and the ram 42 are simultaneously changed until the output from the feedback transducer 204 matches the combined outputs from the transducers 160 and 190. When this occurs, a tool connected with the outer end of the boring bar is rotated about a horizontal axis.

Although the machine 20 has been described in association with a face milling cutter, it is contemplated that other types of rotatable cutting tools may be utilized. For example drills or reamers could be used in association with boring bar 50. By compensating for the combined deflection of the ram 42 and boring bar 50, the cutting plane of either a drill or reamer would be maintained in a desired orientation relative to the workpiece.

Having described a specific preferred embodiment of the invention, the following is claimed:

1. A method of operating a machine tool having a first tool support arm which is extendible and a second tool support arm which is mounted on the first tool support arm and is extendible relative to the first tool support arm, said method comprising moving the first tool support arm between a retracted position and an extended position, storing first data corresponding to the extent of deflection of the first tool support arm at each of a plurality of positions between the retracted and extended positions of the first tool support arm, reading the first data for each of the plurality of positions of the first tool support arm as it is moved between the retracted and extended positions, moving the second tool support arm between a retracted position and an extended position, storing second data corresponding to the extent of deflection of the second tool support arm at each of a plurality of positions between the retracted and extended positions of the second tool support arm, reading the second data for each of the plurality of positions of the second tool support arm as it is moved between its retracted and extended positions, and moving the first and second tool support arms to an extent which is a function of the combined deflection represented by the data read for positions of both of said tool support arms as they are moved between their retracted and extended positions.

2. A method as set forth in claim 1 wherein said step of moving the first and second tool support arms includes simultaneously moving both of the tool support arms through an arcuate distance which is a function of the combined deflection represented by the data read for positions of both of said tool support arms.

3. A method as set forth in claim 1 further including the steps of mounting an adapter on the outer end portion of one of said tool support arms, storing third data which is different than the first and second data to compensate for deflection of the one tool support arm at each of a plurality of positions disposed between the extended and retracted positions of said one tool support arm with the adapter mounted on the outer end portion of the one tool support arm, and reading the third data for each of the plurality of positions of the one tool support arm as said one tool support arm is moved to each of its plurality of positions with the adapter mounted on the outer end portion of the one tool support arm.

4. A method of operating a machine tool having an extendible tool support arm with an outer end portion on which a cutting tool is mounted, said method comprising the steps of locating a cutting edge of the tool in a cutting plane disposed in a first orientation relative to a vertical plane when the tool support arm is retracted, extending the tool support arm, allowing the extended tool support arm to deflect under the influence of gravity, and moving the tool support arm to locate the cutting plane of the tool in said first orientation relative to the vertical plane when the tool support arm is extended and deflected, said step of moving the tool support arm includes the step of lowering an inner end portion of the tool support arm relative to the outer end portion of the tool support arm, said step of moving the tool support arm being performed simultaneously with said step of extending the tool support arm.

5. A method as set forth in claim 4 wherein said step of moving the tool support arm includes the step of changing the angular orientation of the tool support arm relative to a workpiece.

6. A machine tool comprising a support section, a first tool support arm mounted on said support section and movable relative to said support section between a retracted position and an extended position extending outwardly from said support section, a second tool support arm mounted on said first tool support arm and movable relative to said first tool support arm between a retracted position and an extended position extending outwardly from said first tool support arm, first data storage means for storing data corresponding to the extent of deflection of said first tool support arm at each of a plurality of positions disposed between the extended and retracted positions of said first tool support arm, first reader means for reading the stored data for each of the plurality of positions of said first tool support arm as said first tool support arm is moved to each of its plurality of positions, second data storage means for storing data corresponding to the extent of deflection of said second tool support arm at each of a plurality of positions disposed between the extended and retracted positions of said second tool support arm, second reader means for reading the stored data for each of the plurality of positions of said second tool support arm as said second tool support arm is moved to each of its plurality of positions, and means for moving said first and second tool support arms to an extent which is a function of the combined deflection represented by the data read by said first and second reader means as said first and second tool support arms are moved between their extended and retracted positions.

7. A machine tool as set forth in claim 6 wherein said first reader means includes a first cam follower, said first data storage means including a first cam member which is engaged by said first cam follower and means for effecting relative movement between said first cam member and said first cam follower upon movement of said first tool support arm relative to said support section, said second reader means including a second cam follower, said second data storage means including a second cam member which is engaged by said second cam follower and means for effecting relative movement between said second cam member and said second cam follower upon movement of said second tool support arm relative to said first tool support arm.

8. A machine tool as set forth in claim 6 wherein said means for moving said first and second tool support arms includes means for simultaneously moving both of said tool support arms through an arcuate distance which is a function of the combined deflection represented by the data read by said first and second reader means.

9. A machine tool as set forth in claim 6 further including adapter means selectively mountable on an outer end portion of one of said tool support arms for rotating a tool about an axis extending transversely to a longitudinal axis of said one tool support arm, third data storage means for storing data which is different than the data stored in said first and second data storage means to compensate for deflection of said one tool support arm at each of a plurality of positions disposed between the extended and retracted positions of said one tool support arm with said adapter means mounted on the outer end portion of said one tool support arm, and third reader means for reading the stored data for each of the plurality of positions of said one tool support arm as said one tool support arm is moved to each of its plurality of positions with said adapter means mounted on the outer end portion of said one tool support arm.

10. A machine tool as set forth in claim 6 wherein said first tool support arm has an inner end portion which is connected with said support section and an outer end portion which is spaced a substantial distance from said support section when said first tool support arm is in its extended position, said second tool support arm having an inner end portion which is connected with said first tool support arm and an outer end portion which is spaced a substantial distance from said first tool support arm when said second tool support arm is in its extended position, said means for moving said first and second tool support arms including means for lowering the inner end portions of said first and second tool support arms relative to the outer end portions of said first and second tool support arms.

11. A machine tool as set forth in claim 6 further including an upwardly extending track, said support section being movable along said track to raise and lower said first and second tool support arms, said means for moving said first and second tool support arms including means for changing the angular orientation of said first and second tool support arms relative to said track.

12. A machine tool as set forth in claim 11 wherein said means for changing the angular orientation of said first and second tool support arms relative to said track includes means for changing the angular orientation of said support section relative to said track while maintaining the angular orientation of said first and second tool support arms constant relative to said support section.

13. A machine tool comprising an upwardly extending track, a support section connected with and movable along said track, a longitudinally extending tool support arm mounted on said support section and having inner and outer end portions, said tool support arm being movable between a retracted condition in which the outer end portion of said tool support arm is disposed adjacent to said support section and an extended condition in which said tool support arm projects outwardly from said support section and in which the outer end portion of said tool support arm is free to deflect downwardly, and tool support arm deflection compensation means for compensating for deflection of said tool support arm when said tool support arm is in the extended condition, said tool support arm deflection compensation means including means for changing the angular orientation of said support section relative to said track to change the position of the inner end portion of said tool support arm relative to the outer end portion of said tool support arm.

14. A machine tool as set forth in claim 13 wherein said means for changing the angular orientation of said support section includes means for raising the outer end portion of said tool support arm as a function of the extent of deflection of said tool support arm as said tool support arm moves between the extended and retracted conditions.

15. A machine tool as set forth in claim 13 wherein said means for changing the angular orientation of said support section includes means for pivoting said tool support section through an arcuate distance which varies as a function of the extent of deflection of the outer end portion of said tool support arm.

16. A machine tool as set forth in claim 13 wherein said tool support arm deflection compensation means includes means for storing data corresponding to the extent of deflection of the outer end portion of said tool support arm at each of a plurality of positions of said tool support arm, said means for changing the angular orientation of said support section includes means for moving the outer end portion of said tool support arm upwardly relative to the inner end portion of said tool support arm in accordance with the stored data as the tool support arm moves to each of said plurality of positions.

17. A machine tool as set foth in claim 16 wherein said means for moving said outer end portion of said tool support arm upwardly includes means for reading the stored data and effecting pivotal movement of said support section about an axis extending transversely to a longitudinal axis of said tool support arm.

18. A machine tool as set forth in claim 17 wherein said means for storing data includes a cam surface, said means for reading the stored data includes a cam follower which engages the cam surface and means for effecting relative movement between said cam surface and said cam follower during movement of said tool support arm relative to said support section.

19. A method of operating a machine tool having an upwardly extending track along which a carriage for an extendible tool support arm is movable, said method comprising the steps of moving the carriage along the track to raise and lower the tool support arm, extending the tool support arm, allowing the tool support arm to deflect when it is extended, and compensating for deflection of the tool support arm by changing the angular orientation of the carriage relative to the track to change the position of an inner end portion of the tool support arm relative to the position of an outer end portion of the tool support arm.

20. A method as set forth in claim 19 wherein said step of changing the angular orientation of the carriage is performed simultaneously with performance of said step of extending the tool support arm.

21. A machine tool comprising an upwardly extending track, a support section, said support section being movable along said track, a longitudinally extending tool support arm mounted on said support section and movable between a retracted condition in which an outer end portion of said tool support arm is disposed adjacent to said support section and an extended condition in which said tool support arm projects outwardly from said support section and in which the outer end portion of said tool support arm is free to deflect downwardly under the influence of gravity, said tool support arm having a substantially straight configuration when said tool support arm is in the retracted condition, said tool support arm being deflected to have a slightly bowed configuration when said tool support arm is in the extending condition, tool means mounted on the outer end portion of said tool support arm, said tool means having a cutting edge which is movable in a predetermined cutting plane disposed in a first orientation relative to a vertical plane when said tool support arm is in the retracted condition and has a straight configuration, and tool support arm deflection compensation means for compensating for the bowed configuration of said tool support arm when said tool support arm is in the extended condition to locate said cutting plane in said first orientation relative to the vertical plane, said tool supported arm deflection compensation means including means for changing the angular orientation of said tool support arm relative to said track as said tool support arm is moved between the retracted and extended conditions, said means for changing the angular orientation of said tool support arm relative to said track includes a first cam member disposed on a first longitudinally extending side of said track and a second cam member disposed on a second longitudinally extending side of said track opposite from said first longitudinally extending side of said track and means for moving said first and second cam members relative to said track.

22. A machine tool as set forth in claim 21 wherein said means for moving said first and second cam members relative to said track includes means for rotating said first and second cam members about axes extending transversely to a longitudinally extending axis of said tool support arm.

23. A machine tool as set forth in claim 21 wherein said means for moving said first and second cam members relative to said track includes means for moving said cam members along paths disposed on opposite sides of said track and extending substantially parallel to a longitudinal central axis of said track.

24. A machine tool as set forth in claim 21 wherein said means for moving said cam members relative to said track includes means for moving said cam members as a function of the extent of deflection of said tool support arm as said tool support arm moves between the retracted and extended conditions.

25. A machine tool comprising an upwardly extending track, a support section connected with and movable along said track, a longitudinally extending tool support arm mounted on said support section and having inner and outer end portions, said tool support arm being movable between a retracted condition in which the outer end portion of said tool support arm is disposed adjacent to said support section and an extended condition in which said tool support arm projects outwardly from said support section and in which the outer end portion of said tool support arm is free to deflect downwardly, and tool support arm deflection compensation means for compensating for deflection of said tool support arm when said tool support arm is in the extended condition, said tool support arm deflection compensation means including means for changing the angular orientation of said support section relative to said track to change the position of the inner end portion of said tool support arm relative to the outer end portion of said tool support arm, said means for changing the angular orientation of said support section relative to said track includes a first cam member disposed on a first longitudinally extending side of said track and a second cam member disposed on a second longitudinally extending side of said track opposite from said first longitudinally extending side of said track and means for moving said first and second cam members relative to said track.

26. A machine tool comprising an upwardly extending track, a support section, said support section being movable along said track, a longitudinally extending tool support arm mounted on said support section and movable between a retracted condition in which an outer end portion of said tool support arm is disposed adjacent to said support section and an extended condition in which said tool support arm projects outwardly from said support section and in which the outer end portion of said tool support arm is free to deflect downwardly under the influence of gravity, said tool support arm having a substantially straight configuration when said tool support arm is in the retracted condition, said tool support arm being deflected to have a slightly bowed configuration when said tool support arm is in the extended condition, and tool support arm deflected compensation means for compensating for the bowed configuration of said tool support arm when said tool support arm is in the extended condition, said tool support arm deflection compensation means including means for changing the angular orientation of said support section relative to said track as said tool support arm is moved between the retracted and extended conditions.

27. A machine tool as set forth in claim 26 wherein said means for changing the angular orientation of said support section relative to said track includes means for changing the angular orientation of said support section relative to said track while maintaining the angular orientation of a portion of said tool support arm engaged by said support section constant relative to said support section.

28. A machine tool as set forth in claim 26 wherein said means for changing the angular orientation of said support section relative to said track includes means for rotating said support section relative to said track.

29. A machine tool as set forth in claim 25 wherein said means for moving said first and second cam members relative to said track includes means for rotating said first and second cam members about axes extending transversely to a longitudinally extending axis of said tool support arm.

30. A machine tool as set forth in claim 25 wherein said means for moving said first and second cam members relative to said track includes means for moving said cam members along paths disposed on opposite sides of said track and extending substantially parallel to a longitudinal central axis of said track.

31. A machine tool as set forth in claim 25 wherein said means for moving said cam members relative to said track includes means for moving said cam members as a function of the extent of deflection of said tool support arm as said tool support arm moves between the retracted and extended conditions.

32. A machine tool as set forth in claim 26 wherein said means for changing the angular orientation of said support section relative to said track includes a first cam member disposed on a first longitudinally extending side of said track and a second cam member disposed on a second longitudinally extending side of said track opposite from said first longitudinally extending side of said track and means for moving said first and second cam members relative to said track.

33. A machine tool as set forth in claim 26 wherein said means for changing the angular orientation of said support section includes means for raising the outer end portion of said support section as a function of the extent of deflection of said tool support arm as said tool support arm moves between the extended and retracted conditions.

34. A machine tool as set forth in claim 26 wherein said means for changing the angular orientation of said support section includes means for pivoting said support section through an arcuate distance which varies as a function of the extent of deflection of the outer end portion of said tool support arm.

35. A machine tool as set forth in claim 26 wherein said tool support arm deflection compensation means includes means for storing data corresponding to the extent of deflection of the outer end portion of said tool support arm at each of a plurality of positions of said tool support arm, said means for changing the angular orientation of said support section including means for moving said support section relative to said track in accordance with the stored data as the tool support arm moves to each of said plurality of positions.

36. A machine tool comprising a support section, a longitudinally extending tool support arm mounted on said support section and movable between a retracted condition in which an outer end portion of said tool support arm is disposed adjacent to said support section and an extended condition in which said tool support arm projects outwardly from said support section and in which the outer end portion of said tool support arm is free to deflect downwardly under the influence of gravity, and tool support arm deflection compensation means for compensating for deflection of said tool support arm when said tool support arm is in the extended condition, said tool support arm deflection compensation means including means for pivoting said supporting section and said tool support arm together about an axis extending transversely to a longitudinal axis of said tool support arm as said tool support arm is moved relative to said support section.

37. A machine tool as set forth in claim 36 wherein said means for pivoting said support section and tool support arm includes a first cam member disposed adjacent to a first end portion of said support section and a second cam member disposed adjacent to a second end portion of said support section opposite from said first end portion of said support section and means for moving said first and second cam members relative to said support section to effect simultaneous pivotal movement of said support section and said tool support arm.

38. A machine tool as set forth in claim 37 wherein said means for moving said first and second cam members relative to said said support section includes means for simultaneously rotating said first and second cam members about axes extending transversely to the longitudinally extending axis of said tool support arm.

39. A machine tool as set forth in claim 37 wherein said means for moving said cam members relative to said support section includes means for moving said cam members as a function of the extent of deflection of said tool support arm as said tool support arm moves between the retracted and extended conditions.

40. A machine tool as set forth in claim 36 wherein said means for pivoting said support section and said tool support arm includes means for pivoting said support section and said tool support arm through an arcuate distance which varies as a function of the extent of deflection of the outer end portion of said tool support arm.

41. A machine tool as set forth in claim 36 wherein said tool support arm deflection compensation means further includes means for storing data corresponding to the extent of deflection of the outer end portion of said tool support arm at each of a plurality of positions of said tool support arm, said means for pivoting said support section and said tool support arm includes means for moving the outer end portion of said tool support arm upwardly relative to the inner end portion of said tool support arm in accordance with the stored data as the tool support arm moves to each of said plurality of positions.

42. A machine tool as set forth in claim 41 wherein said means for moving said outer end portion of said tool support arm upwardly includes means for reading the stored data and effecting pivotal movement of said support section and said tool support arm about the axis extending transversely to a longitudinal axis of said tool support arm.

43. A machine tool comprising an upwardly extending track, a support section, said support section being movable along said track, a longitudinally extending tool support arm mounted on said support section and movable between a retracted condition in which an outer end portion of said tool support arm is disposed adjacent to said support section and an extended condition in which said tool support arm projects outwardly from said support section and in which the outer end portion of said tool support arm is free to deflect downwardly under the influence of gravity, said tool support arm having a substantially straight configuration when said tool support arm is in the retracted condition, said tool support arm being deflected to have a slightly bowed configuration when said tool support arm is in the extended condition, tool means mounted on the outer end portion of said tool support arm, said tool means having a cutting edge which is movable in a predetermined cutting plane disposed in a first orientation relative to a vertical plane when said tool support arm is in the retracted condition and has a straight configuration, and tool support arm deflection compensation means for compensating for the bowed configuration of said tool support arm when said tool support arm is in the extended condition to locate said cutting plane in said first orientation relative to the vertical plane while allowing said tool support arm to maintain its bowed configuration, said tool support arm deflection compensation means including means for changing the angular orientation of said tool support arm relative to said track as said tool support arm is moved between the retracted and extended conditions.

44. A machine tool as set forth in claim 43 wherein said means for changing the angular orientation of said tool support arm relative to said track includes means for changing the angular orientation of said support section relative to said track.

45. A machine tool as set forth in claim 43 wherein said means for changing the angular orientation of said tool support arm relative to said track includes means for rotating said support section relative to said track.

46. A machine tool comprising a support section, a longitudinally extending tool support arm mounted on said support section and movable between a retracted condition in which an outer end portion of said tool support arm is disposed adjacent to said support section and an extended condition in which said tool support arm projects outwardly from said support section and in which the outer end portion of said tool support arm is free to deflect downwardly under the influence of gravity, said tool support arm having a substantially straight configuration when said tool support arm is in the retracted condition, said tool support arm being deflected to have a slightly bowed configuration when said tool support arm is in the extended condition, tool means mounted on the outer end portion of said tool support arm, said tool means having a cutting edge which is movable in a predetermined cutting plane disposed in a first orientation relative to a vertical plane when said tool support arm is in the retracted condition and has a straight configuration, and tool support arm deflection compensation means for compensating for the bowed configuration of said tool support arm when said tool support arm is in the extended condition to locate said cutting plane in said first orientation relative to the vertical plane while allowing said tool support arm to maintain its bowed configuration, said tool support arm deflection compensation means includes means for pivoting said tool support arm through an arcuate distance which varies as a function of the extent of deflection of the outer end portion of said tool support arm.

47. A machine tool comprising a support section, a longitudinally extending tool support arm mounted on said support section and movable between a retracted condition in which an outer end portion of said tool support arm is disposed adjacent to said support section and an extended condition in which said tool support arm projects outwardly from said support section and in which the outer end portion of said tool support arm is free to deflect downwardly under the influence of gravity, said tool support arm having a substantially straight configuration when said tool support arm is in the retracted condition, said tool support arm being deflected to have a slightly bowed configuration when said tool support arm is in the extended condition, tool means mounted on the outer end portion of said tool support arm, said tool means having a cutting edge which is movable in a predetermined cutting plane disposed in a first orientation relative to a vertical plane when said tool support arm is in the retracted condition and has a straight configuration, and tool support arm deflection compensation means for compensating for the bowed configuration of said tool support arm when said tool support arm is in the extended condition to locate said cutting plane in said first orientation relative to the vertical plane while allowing said tool support arm to maintain its bowed configuration, said tool support arm deflection compensation means includes means for storing data corresponding to the extent of deflection of the outer end portion of said tool support arm at each of a plurality of positions of said tool support arm and means for moving the outer end portion of said tool support arm upwardly relative to the inner end portion of said tool support arm in accordance with the stored data as the tool support arm moves to each of said plurality of positions.

48. A machine tool as set foth in claim 47 wherein said means for moving said outer end portion of said tool support arm upwardly includes means for reading the stored data and effecting pivotal movement of said tool support arm about an axis extending transversely to a longitudinal axis of said tool support arm.

49. A machine tool as set forth in claim 48 wherein said means for storing data includes a cam surface, said means for reading the stored data includes a cam follower which engages the cam surface and means for effecting relative movement between said cam surface and said cam follower during movement of said tool support arm relative to said support section.

50. A machine tool comprising a support section, a longitudinally extending tool support arm mounted on said support section and movable between a retracted condition in which an outer end portion of said tool support arm is disposed adjacent to said support section and an extended condition in which said tool support arm projects outwardly from said support section and in which the outer end portion of said tool support arm is free to deflect downwardly under the influence of gravity, said tool support arm having a substantially straight configuration when said tool support arm is in the retracted condition, said tool support arm being deflected to have a slightly bowed configuration when said tool support arm is in the extended condition, tool means mounted on the outer end portion of said tool support arm, said tool means having a cutting edge which is movable in a predetermined cutting plane disposed in a first orientation relative to a vertical plane when said tool support arm is in the retracted condition and has a straight configuration, and tool support arm deflection compensation means for compensating for the bowed configuration of said tool support arm when said tool support arm is in the extended condition to locate said cutting plane in said first orientation relative to the vertical plane while allowing said tool support arm to maintain its bowed configuration, said tool support arm deflection compensation means includes means for pivoting said support section and said tool support arm together about an axis extending transversely to a longitudinal axis of said tool support arm as said tool support arm is moved relative to said support section.

* * * * *